(12) United States Patent
Barna et al.

(10) Patent No.: US 8,519,321 B2
(45) Date of Patent: Aug. 27, 2013

(54) OPTICAL READING SYSTEM AND METHOD OF OPERATION

(75) Inventors: Anthony F. Barna, North Massapequa, NY (US); Lawrence P. Nardo, Brooklyn, NY (US); Charles W. Melvin, Jr., Dudley, GA (US); Jason P. Walton, Byron, GA (US); A. Arthur Kressner, Westfield, NJ (US)

(73) Assignees: Consolidated Edison Company of New York, Inc., New York, NY (US); Itron, Inc., Liberty Lake, WA (US)

( * ) Notice: Subject to any disclaimer, the term of this patent is extended or adjusted under 35 U.S.C. 154(b) by 781 days.

(21) Appl. No.: 12/624,660

(22) Filed: Nov. 24, 2009

(65) Prior Publication Data

US 2010/0200732 A1    Aug. 12, 2010

Related U.S. Application Data

(60) Provisional application No. 61/151,296, filed on Feb. 10, 2009.

(51) Int. Cl.
*G06M 7/00*    (2006.01)

(52) U.S. Cl.
USPC ........... 250/221; 250/557; 345/639; 345/640; 345/641; 382/199; 382/203; 382/206

(58) Field of Classification Search
USPC ................. 250/221, 557; 382/203, 206, 199; 345/639–641
See application file for complete search history.

(56) References Cited

U.S. PATENT DOCUMENTS

| | | | |
|---|---|---|---|
| 3,945,018 A | 3/1976 | Suwama et al. | |
| 4,354,106 A | 10/1982 | Walter | |
| 4,614,945 A | 9/1986 | Brunius et al. | |
| 4,680,704 A * | 7/1987 | Konicek et al. | 382/100 |
| 4,811,011 A | 3/1989 | Sollinger | |
| 4,922,111 A | 5/1990 | Kuwano et al. | |

(Continued)

FOREIGN PATENT DOCUMENTS

| EP | 816601 A2 | 1/1998 |
|---|---|---|
| EP | 1865290 | 12/2007 |

(Continued)

OTHER PUBLICATIONS

Non-final Office Action mailed Jun. 23, 2011 for U.S. Appl. No. 12/368,610, filed Feb. 10, 2009; Inventor Anthony F. Barna.

(Continued)

*Primary Examiner* — Georgia Y Epps
*Assistant Examiner* — Kevin Wyatt
(74) *Attorney, Agent, or Firm* — Cantor Colburn LLP

(57) ABSTRACT

An optical sensor for detecting motion or movement in an area of interest and a method of operation is provided. The system includes a CMOS sensor having an array of pixels that captures images in an area of interest. The system monitors the average pixel value for the array to define a first state. If the average pixel value changes beyond a defined threshold, the system defines a second state. For each change in state, a signal is generated. In one embodiment, the optical sensor is used with a meter having a dial with an indicator. The optical sensor generates a signal each time the indicator passes through the area of interest to allow for the remote monitoring of a consumable commodity.

7 Claims, 12 Drawing Sheets

(56) References Cited

U.S. PATENT DOCUMENTS

| | | | |
|---|---|---|---|
| 5,296,942 A * | 3/1994 | Yokoyama et al. | 358/461 |
| 5,406,075 A | 4/1995 | Pettenden | |
| 5,729,663 A * | 3/1998 | Lin et al. | 358/1.9 |
| 5,767,790 A | 6/1998 | Jovellana | |
| 6,426,497 B1 | 7/2002 | Martinez et al. | |
| 6,437,692 B1 | 8/2002 | Petite et al. | |
| 6,507,015 B1 | 1/2003 | Maeno et al. | |
| 6,642,505 B1 | 11/2003 | Nakano et al. | |
| 6,784,807 B2 | 8/2004 | Petite et al. | |
| 6,812,451 B2 | 11/2004 | Bluemcke et al. | |
| 6,836,737 B2 | 12/2004 | Petite et al. | |
| 6,895,069 B2 | 5/2005 | Kim | |
| 7,019,667 B2 | 3/2006 | Petite et al. | |
| 7,042,368 B2 | 5/2006 | Patterson et al. | |
| 7,049,976 B2 | 5/2006 | Hunt et al. | |
| 7,209,840 B2 | 4/2007 | Petite et al. | |
| 7,228,726 B2 | 6/2007 | Kates | |
| 7,248,181 B2 | 7/2007 | Patterson et al. | |
| 7,377,137 B1 | 5/2008 | Bednarz | |
| 7,385,524 B1 | 6/2008 | Orlosky | |
| 7,443,313 B2 | 10/2008 | Davis et al. | |
| 7,476,848 B2 | 1/2009 | Argast et al. | |
| 7,514,668 B2 | 4/2009 | Ooi et al. | |
| 7,612,332 B2 | 11/2009 | Frenzel et al. | |
| 7,675,027 B2 | 3/2010 | Cheng et al. | |
| 7,714,740 B2 * | 5/2010 | Lipman | 340/688 |
| 7,755,029 B2 | 7/2010 | Tang et al. | |
| 8,127,628 B2 | 3/2012 | Barna et al. | |
| 8,138,465 B2 | 3/2012 | Aldiek | |
| 2001/0055425 A1 * | 12/2001 | Chiu | 382/199 |
| 2002/0193144 A1 | 12/2002 | Belski et al. | |
| 2003/0025612 A1 | 2/2003 | Holmes et al. | |
| 2005/0144437 A1 | 6/2005 | Ransom et al. | |
| 2005/0199792 A1 | 9/2005 | Argast et al. | |
| 2006/0091877 A1 | 5/2006 | Robinson et al. | |
| 2006/0158347 A1 | 7/2006 | Roche et al. | |
| 2006/0219863 A1 | 10/2006 | Burch et al. | |
| 2006/0255152 A1 | 11/2006 | Xie et al. | |
| 2006/0291004 A1 * | 12/2006 | Dymetman | 358/474 |
| 2007/0138377 A1 | 6/2007 | Zarem | |
| 2007/0146262 A1 * | 6/2007 | Ogasawara et al. | 345/87 |
| 2007/0171092 A1 | 7/2007 | Allgood | |
| 2007/0181785 A1 | 8/2007 | Helbing et al. | |
| 2007/0228262 A1 | 10/2007 | Cantin et al. | |
| 2008/0068006 A1 | 3/2008 | Briese et al. | |
| 2008/0180275 A1 | 7/2008 | Whitaker et al. | |
| 2008/0218164 A1 * | 9/2008 | Sanderford | 324/260 |
| 2008/0302172 A1 | 12/2008 | Kates | |
| 2009/0058088 A1 | 3/2009 | Pitchford et al. | |
| 2009/0058676 A1 | 3/2009 | Orlosky | |
| 2009/0142000 A1 * | 6/2009 | Sono | 382/274 |
| 2009/0251414 A1 | 10/2009 | Chen et al. | |
| 2009/0278033 A1 | 11/2009 | Lin et al. | |
| 2009/0316213 A1 * | 12/2009 | Cassidy et al. | 358/3.03 |
| 2010/0199747 A1 | 8/2010 | Barna et al. | |
| 2010/0200735 A1 | 8/2010 | Barna et al. | |

FOREIGN PATENT DOCUMENTS

| | | |
|---|---|---|
| JP | 726798 Y2 | 6/1995 |
| JP | 9166459 | 6/1997 |
| JP | 2006011642 | 1/2006 |
| JP | 2006077508 A | 3/2006 |
| KR | 200166049 | 2/2000 |
| KR | 100273091 B1 | 9/2000 |
| KR | 20070061112 A | 6/2007 |
| KR | 100760535 B1 | 9/2007 |
| KR | 20080029503 | 4/2008 |
| KR | 20080095992 | 10/2008 |
| WO | 2007050022 A2 | 5/2007 |

OTHER PUBLICATIONS

International Search Report dated Jun. 22, 2010 for International Application No. PCT/US2009/064585.

International Search Report dated Jul. 5, 2010 for International Application No. PCT/US2009/065123.

International Search Report dated Jun. 30, 2010 for International Application No. PCT/US2009/065331.

International Search Report dated Jun. 4, 2010 for International Application No. PCT/US2009/064182.

Written Opinion of the International Searching Authority mailed Jun. 22, 2010 for International Application No. PCT/US2009/064585.

Written Opinion of the International Searching Authority mailed Jul. 5, 2010 for International Application No. PCT/US2009/065123.

Written Opinion of the International Searching Authority mailed Jun. 30, 2010 for International Application No. PCT/US2009/065331.

Written Opinion of the International Searching Authority mailed Jun. 4, 2010 for International Application No. PCT/US2009/064182.

International Preliminary Report on Patentability, dated Aug. 25, 2011 for International Application No. PCT/US2009/065123.

* cited by examiner

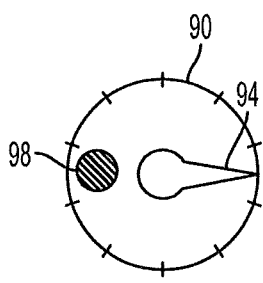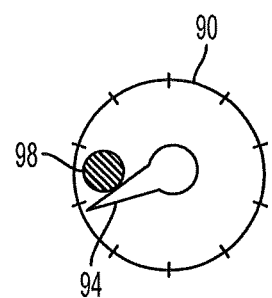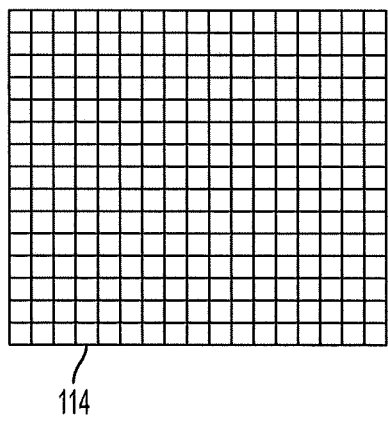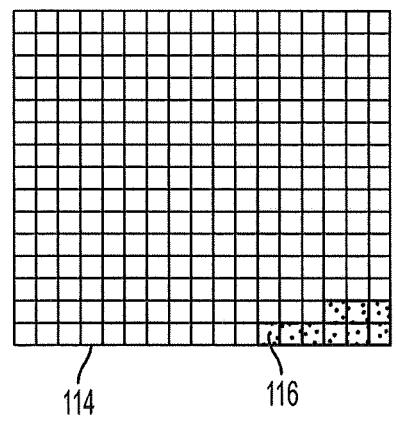
FIG. 11                           FIG. 12

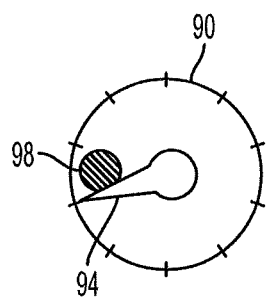
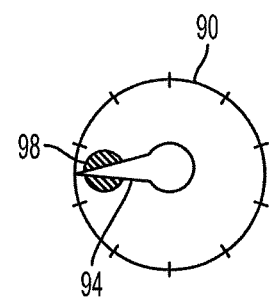
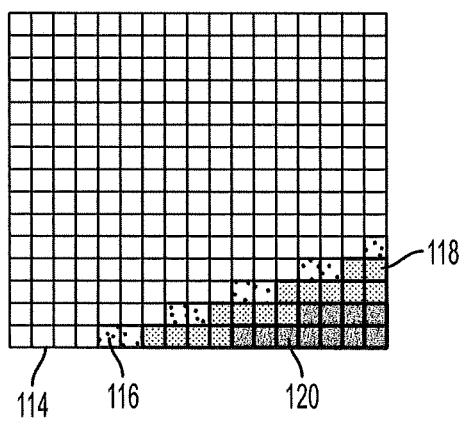
FIG. 13
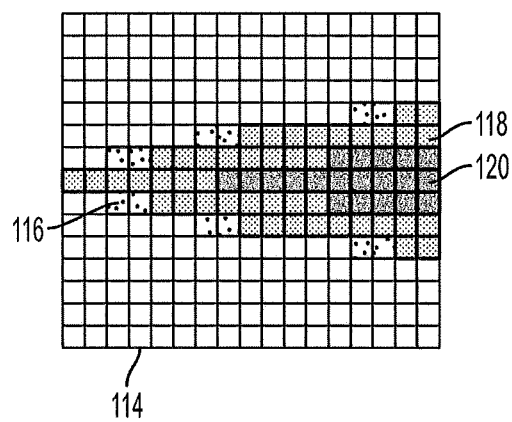
FIG. 14

OPTICAL READING SYSTEM AND METHOD OF OPERATION

CROSS REFERENCE TO RELATED APPLICATIONS

This application is a non-provisional application of U.S. Provisional Patent Application 61/151,296 entitled "OPTICAL READING SYSTEM AND METHOD OF OPERATION" filed Feb. 10, 2009 and which is incorporated herein in its entirety.

BACKGROUND OF THE INVENTION

The present invention relates generally to an optical sensor and more particularly to an optical sensor for detecting an object within an area of interest.

Optical sensors are used in a wide variety of applications, such as in robotics, touch screen devices and digital cameras. These optical sensors typically use either a complementary metal oxide semiconductor ("CMOS") or a charge coupled device ("CCD") type of sensor. The sensors use light sensitive circuitry, commonly referred to as a pixel, to convert light energy into electrical energy. Each pixel typically includes a photodiode formed in a silicon substrate. As the photodiode is exposed to light, an electrical charge is induced. The level of the charge indicates amount of light and a level of contrast can be determined by calibrating the electrical charge to a color scale. The color of the image may be determined by using either filters over the pixels or by having pixels with photodiodes that only react to certain wavelengths of light.

While optical sensors are used in a wide variety of applications, its use in some applications can be hampered due to cost. Low cost sensors are used in some applications, such as in computer mice for example, that are well defined and reasonably controlled. Otherwise environmental effects, such as ambient light for example, interfere with the operation of the sensor. In the case of the computer mouse, the sensor needs to be close to the surface with the mouse resting against the surface to block out light. If the mouse is lifted even a small amount, operation ceases. This limitation restricts the wide adoption of low cost optical sensors into applications where the sensor may be installed outdoors, or in an equipment room that is normally dark and periodically exposed to varying light conditions.

The use of optical sensors in remote applications has also been hampered by power requirements. Remote locations may be any location where an external electrical power supply may not be readily available. Without an external energy supply, the optical sensor must rely on some type of battery-type storage system. Since the replacement of batteries increases the maintenance costs associated with the optical sensor, operators typically find it desirable to minimize power consumption. This power requirement may also create an issue with control circuitry. Image analysis can be a computationally intensive operation that requires one or more fast processors and extended computation time. Generally, the faster the processor and the longer the computation time, the more energy is consumed.

Thus, while existing sensing devices are suitable for their intended purposes, there remains a need for improvements. In particular, there remains a need for improvements in providing reliable, accurate and cost effective methods and systems for operating an optical sensor that can be used in a wide variety of applications with minimal power consumption.

There also remains a need for improvements in analyzing acquired images that minimizes computation requirements and energy consumption.

SUMMARY OF THE INVENTION

A method of operating an optical reader is provided. The method includes the step of capturing a first image with a sensor having an array of pixels. A first image value is generated from the first image. The first image value is stored. The first image value is compared to a threshold and a signal is generated if the first image value exceeds the threshold.

A method of operating an optical reading system having a sensor capable of acquiring images in an area of interest is also provided. The method includes the steps of acquiring a first image with said sensor. A first image value is determined for the first image. A previous-state variable is set to a first value if the first image value is above a threshold value. The previous-state variable is set to a second value if the first image value is at or below the threshold value. A second image is acquired with the sensor. A second image value is determined for the second image. A new-state variable is set to the first value if the second image value is above the threshold value. The new-state variable is set to the second value if the second image value is below the threshold value. The new-state variable is compared to the present-state variable and generating a signal if the new-state variable is equal to the second value and the previous-state value is equal to the first value.

An optical reading system is provided having an optical sensor. A lens is adjacent the optical sensor and arranged to focus the optical sensor on an area of interest. A controller is electrically coupled to the optical sensor, the controller having a first processor that is responsive to executable computer instructions for determining if an object is present in the area of interest in a first acquired image and not present in a second acquired image and transmitting a first signal in response to said object being present in the first acquired image and not present in the second acquired image, wherein the second acquired image is acquired later in time than the first acquired image.

BRIEF DESCRIPTION OF THE DRAWINGS

Referring now to the drawings, which are meant to be exemplary and not limiting, and wherein like elements are numbered alike:

FIGS. 11-16 are a schematic plan view of an indicator and optical sensor array of FIG. 9 at different positions in time.

DETAILED DESCRIPTION

Figure 1:
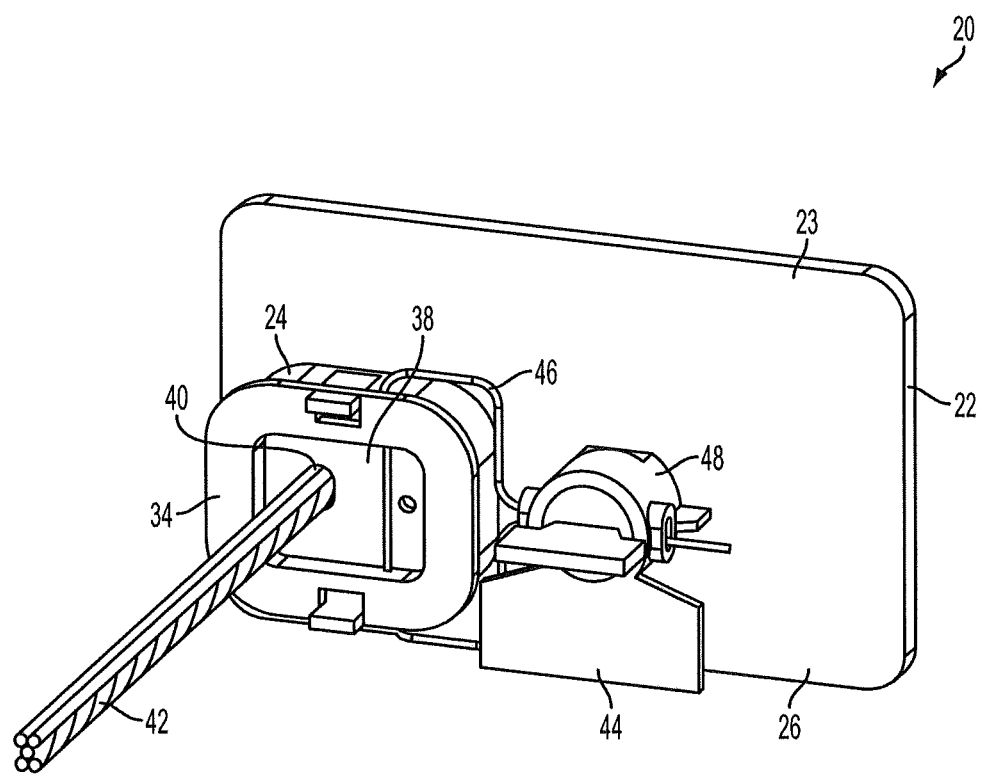
FIG. 1 is a perspective view illustration of an optical sensor in accordance with an embodiment of the invention.
Figure 2:
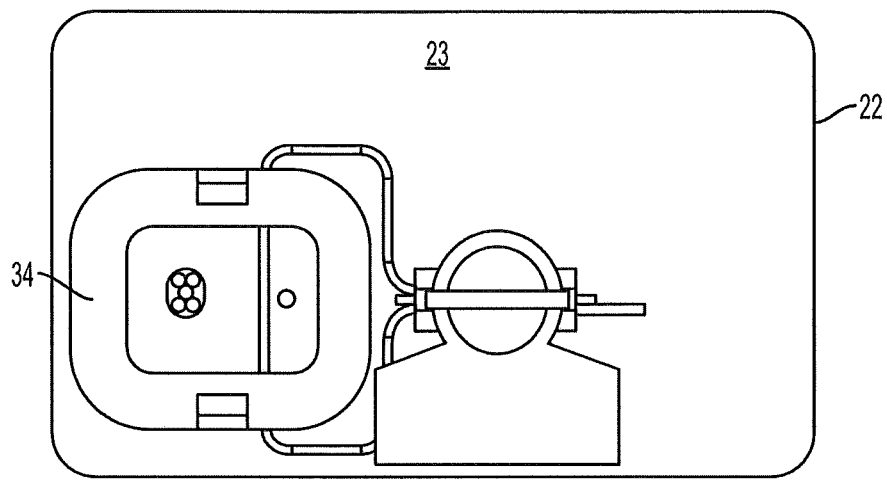
FIG. 2 is a top plan view illustration of the optical sensor of FIG. 1.
Figure 3:
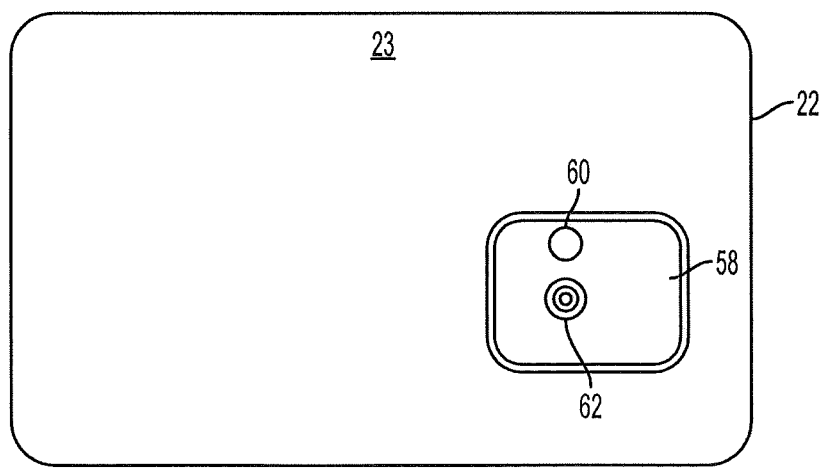
FIG. 3 is bottom plan view illustration of the optical sensor of FIG. 1.
Figure 4:
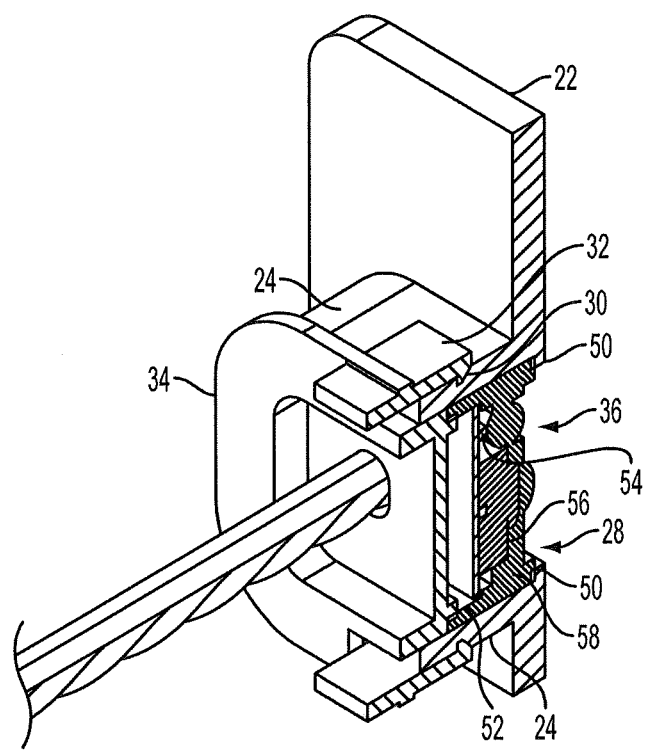
FIG. 4 is a sectional perspective view illustration of the optical sensor of FIG. 3.

FIGS. 1-4 illustrate an exemplary embodiment of an optical sensor 20. Optical sensors may be used in a wide variety of applications where motion or other visual changes need to be monitored. The optical sensor 20 includes a base 22 having a wall 24 extending from one side 26. The wall 24 encloses an area that forms an opening 28 through the base 22. In the exemplary embodiment, the base 22 has a planar portion 23 that is made from a translucent material, such as acrylic or polycarbonate for example, which allows an operator to see the area behind the optical sensor 20. As will be discussed in more detail below, in one embodiment the base 22 or the planar portion 23 are also an optical filter that absorbs a desired range of wavelengths of light while transmitting others.

The wall 24 includes a recess 30 that is sized to receive a clip 32 on cap member 34. The clip 32 provides a snap fit connection that retains the cap member 34 on the wall 24. Cap 34 further encloses one end of the area formed by the wall 24 and retains a sensor assembly 36. The cap 34 further includes a recessed area 38. The recess 38 includes an opening 40 that allows wiring 42 from the sensor assembly 36 to exit the optical sensor 20 to be coupled to other devices such as a power source 45 (FIG. 5), a relay 47 (FIG. 5), or other control circuitry (not shown).

Optical sensor 20 may also include an optional locking assembly 44. The locking assembly 44 provides an indication to the operator if the optical sensor 20 has been tampered with. In the exemplary embodiment, the locking assembly 44 includes a wire 46 that extends from a lock mechanism 48 and through holes in the wall 24 and cap 34. The wire 46 extends across the recessed area 38 and back through an additional set of openings in the wall 24 and cap 34 on the opposite side. The wire is then returned to the locking mechanism 48. In the exemplary embodiment, the locking mechanism 48 is a ratchet type mechanism that pulls the wire in only one direction allowing the wire to be securely tightened as the ratchet mechanism is engaged. Since the ratchet allows the wire 46 to be pulled in only one direction, the wire 46 needs to be cut before the cap 34 can be removed from the walls 24. Therefore, as long as the wire remains intact, the operator has some assurance that there has been no interference in the operation of the optical sensor 20.

The sensor assembly 36 is captured in the area enclosed by the wall 24 between the cap 34 and a lip 50 in the base 22. The sensor assembly 36 includes a circuit board 52 on one end having control circuitry 55 (FIG. 5) with a light emitting diode 54 and a complementary metal-oxide-semiconductor ("CMOS") sensor 56. Opposite the circuit board 52 is a lens member 58 that forms a first or illumination lens 60 adjacent to an LED 54 and a second or focusing lens 62 adjacent a CMOS sensor 56. In the exemplary embodiment, the lens member 58 is a single piece molded out of a suitable polymer, such as polycarbonate for example, that forms both lenses 60 and 62. It should be appreciated, however, that lenses 60 and 62 may alternatively be fabricated separately and assembled into the lens member 58.

The illumination lens 60 is arranged to receive light emitted by LED 54 and focuses the light to illuminate an area of interest located adjacent to the optical sensor 20. In the exemplary embodiment, the illuminated area has a diameter of 0.06 inches to 0.08 inches and the lens has a depth of field of a ¼ inch. As will be made clearer herein, the focusing of light from the LED 54 into a small area of interest provides advantages in minimizing the impact of ambient light changes and in reducing electrical power consumption. In the exemplary embodiment, the illumination lens 60 is arranged to direct the light at an angle such that when it strikes the area of interest, it reflects back to the focus lens 62. The angle of the illumination lens 60 will depend on the application, and the distance between the illumination lens 60 and the focus lens 62.

The focus lens 62 cooperates with an aperture stop on the CMOS sensor 56 to provide the desired field of view and depth of field to receive reflected light reflected from the area of interest. By focusing on the area of interest, the CMOS sensor is less susceptible to changes in the ambient light causing a false indication of movement or a change in the area of interest. As discussed above, in one embodiment, the base 22 is also an optical filter that absorbs certain wavelengths of light. Optical filtering may be absorptive, in which inorganic or organic compounds are added to the material. These compounds absorb some wavelengths of light while transmitting others. A second type of filter is a diachronic filter in which a thin film is coated on the base 22 to reflect unwanted wavelengths of light and transmit the remainder. In the exemplary embodiment, the base 22 is an absorptive filter where the compounds are additives that are molded into the base 22.

Figure 7:
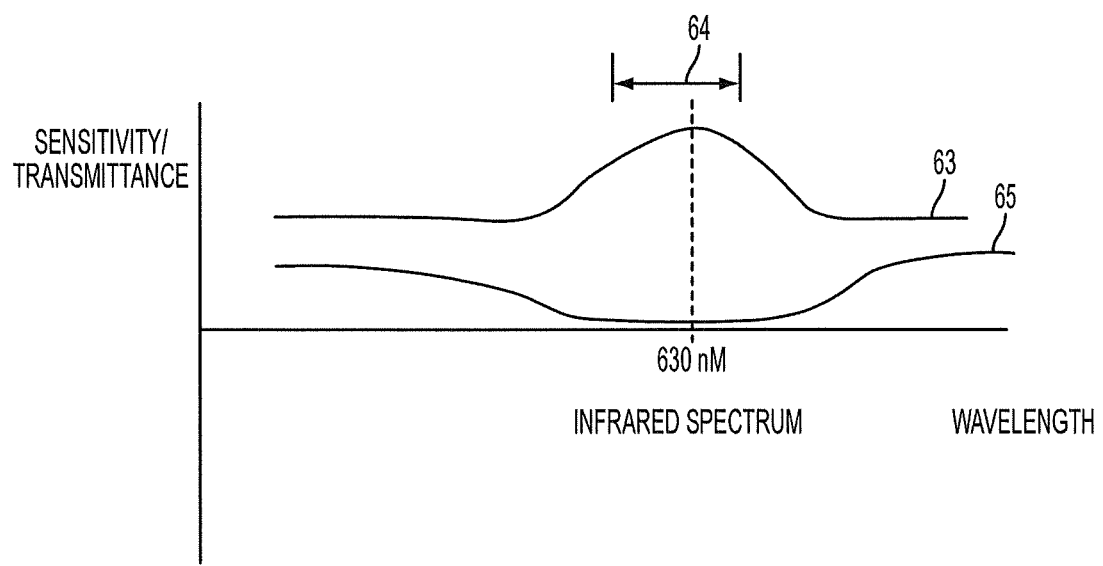
FIG. 7 is a graphical illustration of CMOS sensor sensitivity and optical filter sensitivity versus light wavelength.

As illustrated in FIG. 7, CMOS sensor 56 may be selected to have a sensitivity profile 63 that provides for spectrums or ranges of wavelengths of light 64 in which they are more sensitive than others. In the exemplary embodiment, the CMOS sensor 56 is more sensitive in a band of wavelengths centers about 630 nanometers. Similarly, an optical filter may be tuned to have a filtering profile 65 that provides filtering to selectively absorb or reflect wavelengths of light within a desired range. By forming the base 22 as an optical filter, ambient light can be selectively filtered to minimize the potential for ambient light in having wavelengths in the range 64 from reflecting into the CMOS sensor 56. Thus the performance of the optical sensor 20 is improved while simultaneously allowing the operator to visually view the area of interest through the translucent base 22.

In the exemplary embodiment, the CMOS sensor 56 is an active-pixel sensor consisting of an integrated circuit containing an array of pixel sensors with each pixel containing a photodetector. The CMOS sensor 56 includes a two-dimensional array of pixels that is organized into rows and columns as illustrated in FIGS. 11-16. In the exemplary embodiment, the pixel array consists of 225 elements arranged in a 15×15 array. Each of the pixels has a resolution that allows for 256 contrast levels. When light strikes the pixel photodetector, a signal indicating a level of contrast is generated for that pixel. When combined with signals from the other pixels in the array, an image having 256 levels or contrast, or gray scale, may be generated. Typically, absolute black generates a "0" or zero value, while absolute white generates a value of 256. It should be appreciated that that absolute black or absolution white is not typically detected and that the value of the signal generated by the pixel is between these extremes.

The LED 54 is a semiconductor diode that emits light when an electrical current is applied in the forward direction of the device. The effect is a form of electroluminescence where incoherent and narrow-spectrum light is emitted from the diodes p-n junction. The color of the emitted light depends on the composition and condition of the semiconducting material used, and can be infrared, visible, or ultraviolet. In the exemplary embodiment, the color of the LED 54 is selected to produce light within the near infrared spectrum of range 64, and preferably centered on 630 nanometers, where the CMOS sensor 56 exhibits an increased sensitivity. It should be appreciated that advantages may be gained in reducing power consumption by the optical sensor 20 by matching the LED 54 light color, the sensitivity range 64 of CMOS sensor 56, and the optical filtering by the base 22. By appropriate matching of these components, the brightness of the LED 54 needed to activate the photodetectors in the CMOS sensor 56 may be reduced. In the exemplary embodiment, the LED 54 and CMOS sensor 56 draw an electrical current of less than 50 micro-ampere.

Figure 5:
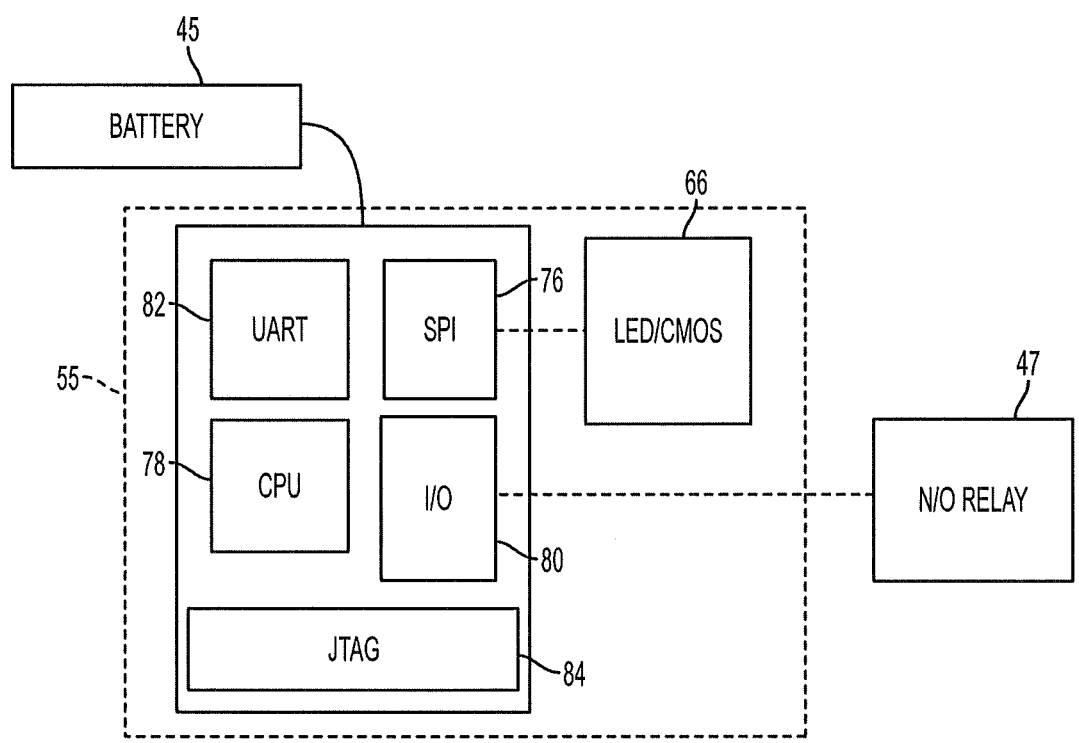
FIG. 5 is a schematic illustration of a control system for the optical sensor in accordance with an embodiment of the invention.
Figure 6:
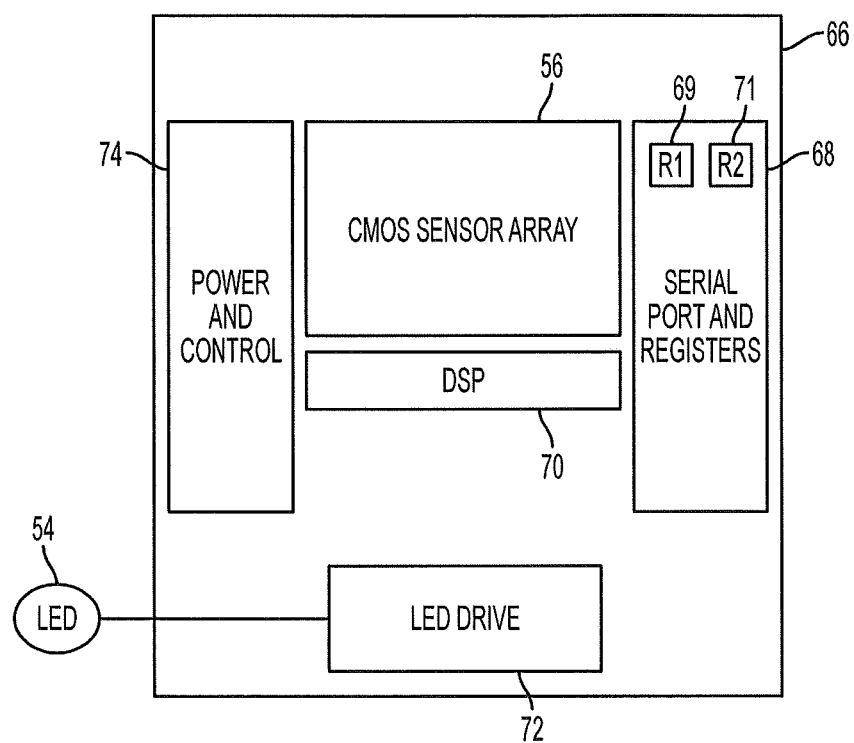
FIG. 6 is a schematic illustration of an LED/CMOS circuit in accordance with an embodiment of the invention.

Turning now to FIG. 5 and FIG. 6, an exemplary embodiment control system for optical sensor 20 will be described. The control circuitry 55 includes a sensor integrated circuit ("IC") 66. The sensor IC 66, such as Model ADNS-5030 sensor manufactured by Avago Technologies for example, provides a subsystem control registers and serial communications interface 68, a digital signal processor ("DSP") 70, the CMOS sensor array 56, an LED driver 72, LED 54, and power management circuitry 74.

The sensor IC 66 captures images using the CMOS sensor array 56. The images are acquired sequentially and then analyzed by the digital signal processor 70 to determine the direction and magnitude of any detected movement. Data related to the pixel values, or direction and magnitude of movement is then placed in the registers 68 where it can be accessed by other processors in control circuitry 55 via system packet interface 76. In the exemplary embodiment, the registers 68 include an averaging register 69, and an image register 71. The averaging register 69 stores a value calculated by the DSP 70 that averages the pixel values captured by the CMOS sensor array 56. As the image changes, the average pixel value of the array will also change. As will be discussed in more detail below, the changing of the average pixel value provides a means for the detecting the presence of an object, such as indicator 94 for example, in the area of interest 98. The registers 68 may also include an image register 71 that contains values of each of the individual pixels. By extracting data from the image register 71, the acquired image may be reconstructed. It should be appreciated that the image register 71 may be composed of a number of individual registers.

The control circuitry also includes a microprocessor 78, such as a Model MSP430F2122 microcontroller manufactured by Texas Instruments for example. Microprocessor 78 is a suitable electronic device capable of accepting data and instructions, executing the instructions to process the data, and presenting the results. Microprocessor 78 may accept instructions through electrical transfer, such as through universal asynchronous receiver/transmitter ("UART") 82 or via an interface such as one compliant with IEEE 1149.1 standards ("JTAG") 84. Microprocessor 78 may also accept instructions through other means such as but not limited to a user interface, electronic data card, voice activation means, manually operable selection and control means, radiated wavelength and electronic or electrical transfer. Therefore, microprocessor 78 can be a microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

In the exemplary embodiment, the microprocessor 78 has a low power standby mode that consumes less than 0.1 µA of electrical current. The microprocessor 78 has a 16-Bit RISC architecture and operates at 16 MHz. In one embodiment, the microprocessor is capable of activating from standby mode within 1 µS from an interrupt. The use of a low power microprocessor 78 and by matching the LED 54, CMOS sensor 56 and the optical filtering of base 22, the control circuitry 55 has an electrical current draw of less than 100 micro-amperes, and more desirably less than 50 micro-amperes.

Microprocessor 78 includes operation control methods embodied in application code. These methods are embodied in computer instructions written to be executed by sensor IC 66 for example, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

As will be discussed in more detail below, the microprocessor 78 receives data stored in the registers 68, such as average register 69 and image register 71 for example, from the sensor IC 66 via the system packet interface 76. The microprocessor 78 then determines if the acquired image data to a previous acquired data to determine if there has been a change in state. The information regarding the acquired image may then be further utilized or additional actions taken. For example, where the optical sensor 20 is installed on a gauge, such as a pressure gauge for example, the area of interest may be a particular pressure. Once this pressure threshold has been crossed, the operator may need to take additional steps. These actions, which could include alarms for example, may then be carried out by the operator, or in some embodiments by the microprocessor 78. In one embodiment, the optical sensor 20 is used to measure the number of times motion is detected, such as when the gauge is an accumulator or meter for example. In this embodiment, the microprocessor causes a single pulse to issue via input/output circuitry 80 to relay 47. The relay 47 may interface the optical sensor 20 to other circuits such as an advanced metering infrastructure ("AMI") device that uses the pulse signal to increment a counter. In one embodiment, the counter indicates an amount of a product or commodity that was consumed by an end customer.

It should be appreciated that while the sensor IC 66 and the microprocessor 78 are described as separate components, the claimed invention should not be so limited. In one embodiment, the functionality of the sensor IC 66 and the microprocessor 78 are combined in a single integrated chip. Further, control circuitry 55 may have additional components (not shown) such as but not limited to random access memory (RAM), nonvolatile memory (NVM), read-only memory (ROM), analog-to-digital (A/D) converters and communications interfaces.

Electrical power needed by the optical sensor 20 for operation is provided by power source 45. In the exemplary embodiment, the power source 45 is a battery 45 and may be integrated onto the base 22 or remotely located to allow a smaller form factor for the sensing portion of optical sensor 20. In the exemplary embodiment, the battery 45 is a lithium thionyl chloride battery with a capacity of 19,000,000 microampere hours. In the embodiments having 100 micro-amps of current draw, this provides an operational life of over 21 years without a requiring a change of battery 45.

Figure 8:
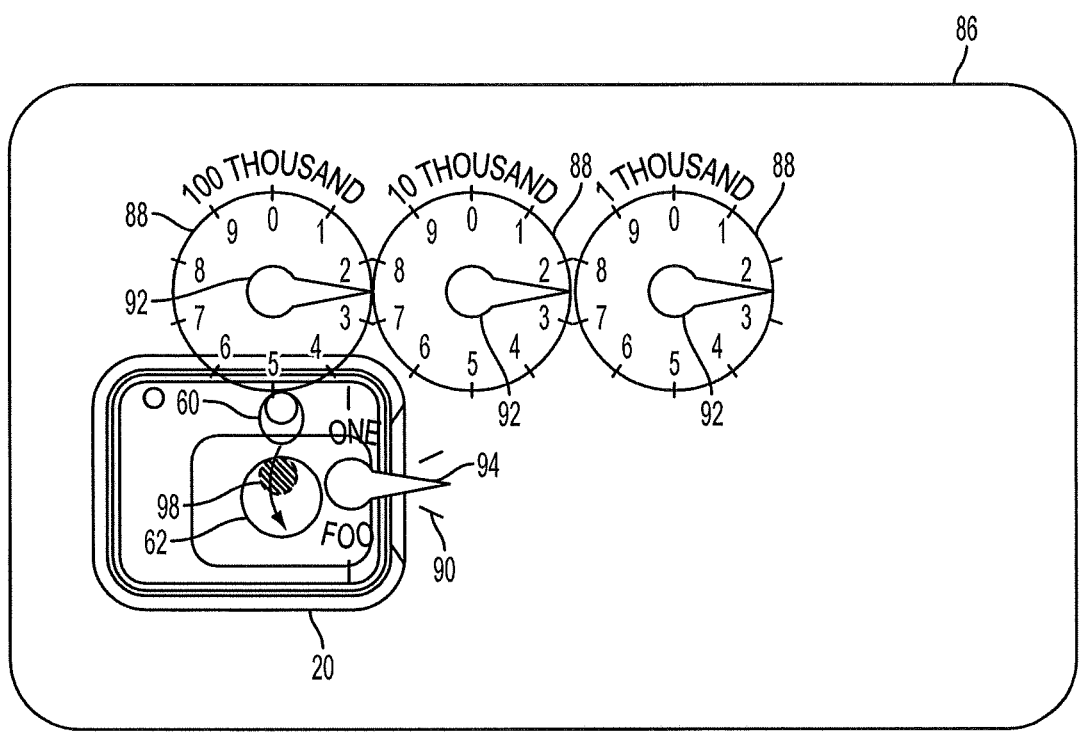
FIG. 8 is a partial top plan view illustration of an exemplary application for the optical sensor of FIG. 1.
Figure 9:
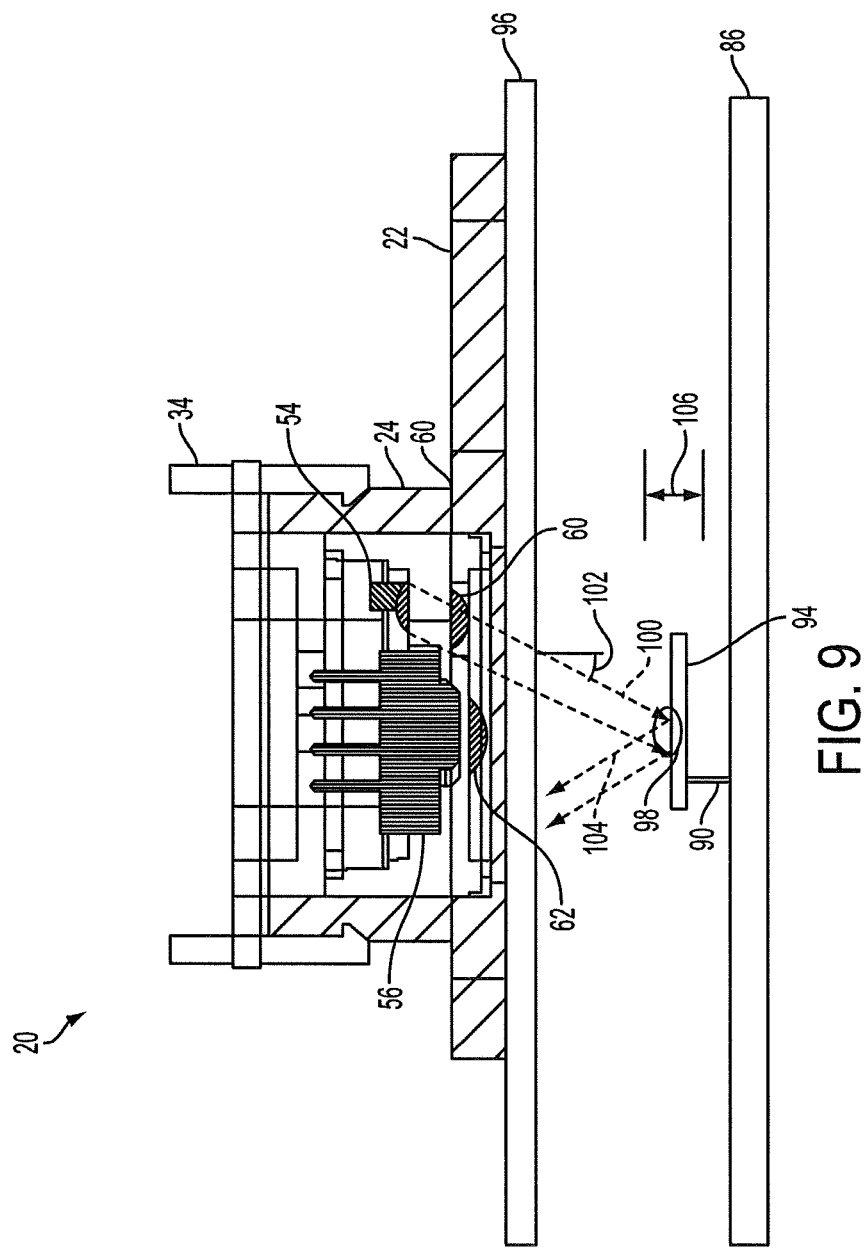
FIG. 9 is a partial side plan sectional view illustration of the exemplary application of FIG. 8

An exemplary application for optical reader or sensor 20 is illustrated in FIG. 8 and FIG. 9. In this application, that optical sensor 20 is affixed to a meter 86, such as a water, gas or electric meter for example. The meter has a plurality of dials 88 that have an indicator 92 that shows the amount of a product (e.g. water, gas or electricity) consumed. The dials 88 typically increment in response to the rotation of the indicator 94 on a measurement dial 90. A mechanical or magnetic linkage typically couples the measurement dial 90 to a measurement mechanism within the meter 86, for example. The dials 88, 90 may be located within a sealed compartment to prevent contamination and tampering.

The dials 88, 90 are viewable through a translucent window 96. The optical sensor 20 is mounted to the window 96 with the focus lens 62 and illumination lens 60 are positioned adjacent the area of interest 98. It should be appreciated that the spacing between the focus lens 62 and the illumination lens 60, along with the angle 102 that the illumination lens 60 direct the light 100 are arranged such that the area of interest 98 falls in an area that the indicator 94 travels as it rotates about the dial 90. In this way, when the indicator 94 is in the area of interest 98, the light 100 from LED 54 reflects off of the indicator 94 and the focus lens 62 receives the reflected light 104. When the indicator 94 is not present, the light 100 reflects off of the dial surface 106. Thus the CMOS sensor 56 records the image of the indicator 94 passing through the area of interest 98.

In the exemplary embodiment, the CMOS sensor 56 records an image of the area of interest 98 on a periodic basis. By not continuously imaging the area, data storage requirements may be minimized and the power consumption reduced. As a result, depending on the speed of the dial, multiple images of the indicator 94 may be acquired as it passes through the area of interest 98. The timing of the image acquisition is controlled by instructions issued by the microprocessor 78 to the sensor IC 66. By timing the acquisition of the indicator 94 into the area of interest 98, the microprocessor 78 can receive an image of the indicator 94 entering and a separate image of the indicator 94 leaving the area of interest. The use of multiple images may then be used by the microprocessor 78 to validate that the indicator 94 has passed without the risk of double counting.

It should be appreciated that the location of the area of interest may vary over a distance as indicated by arrow 106. This variation may be due to a variety of factors, including tolerance stackup between components on meter 86, differences between models of meters and the like. The lens 60, 62 are arranged to have a field of view that accounts for this variation without having the area of interest becoming too small (when the area of interest is closer) or becoming too large (when the area of interest is farther away). In the exemplary embodiment, the area of interest has a diameter of 0.06 inches to 0.08 inches and the field of view may vary over 0.25 inches.

In one embodiment the operation of the optical sensor 20 may be described in terms of a finite state machine. Finite state machines, commonly referred to as state machines, are widely used in microprocessor and controller designs for a variety of purposes, including controlling sequences of actions. A state machine is a model of behavior comprising states and transitions. A state represents the sequence of inputs to the state machine from its start to the present moment. A transition specifies a change in state from the current state, often, though not necessarily, as a result of one or more inputs received. In hardware, state machines are typically implemented as registers to store state variables and combinatorial logic gates to implement transitions and state machine outputs.

Figure 10:
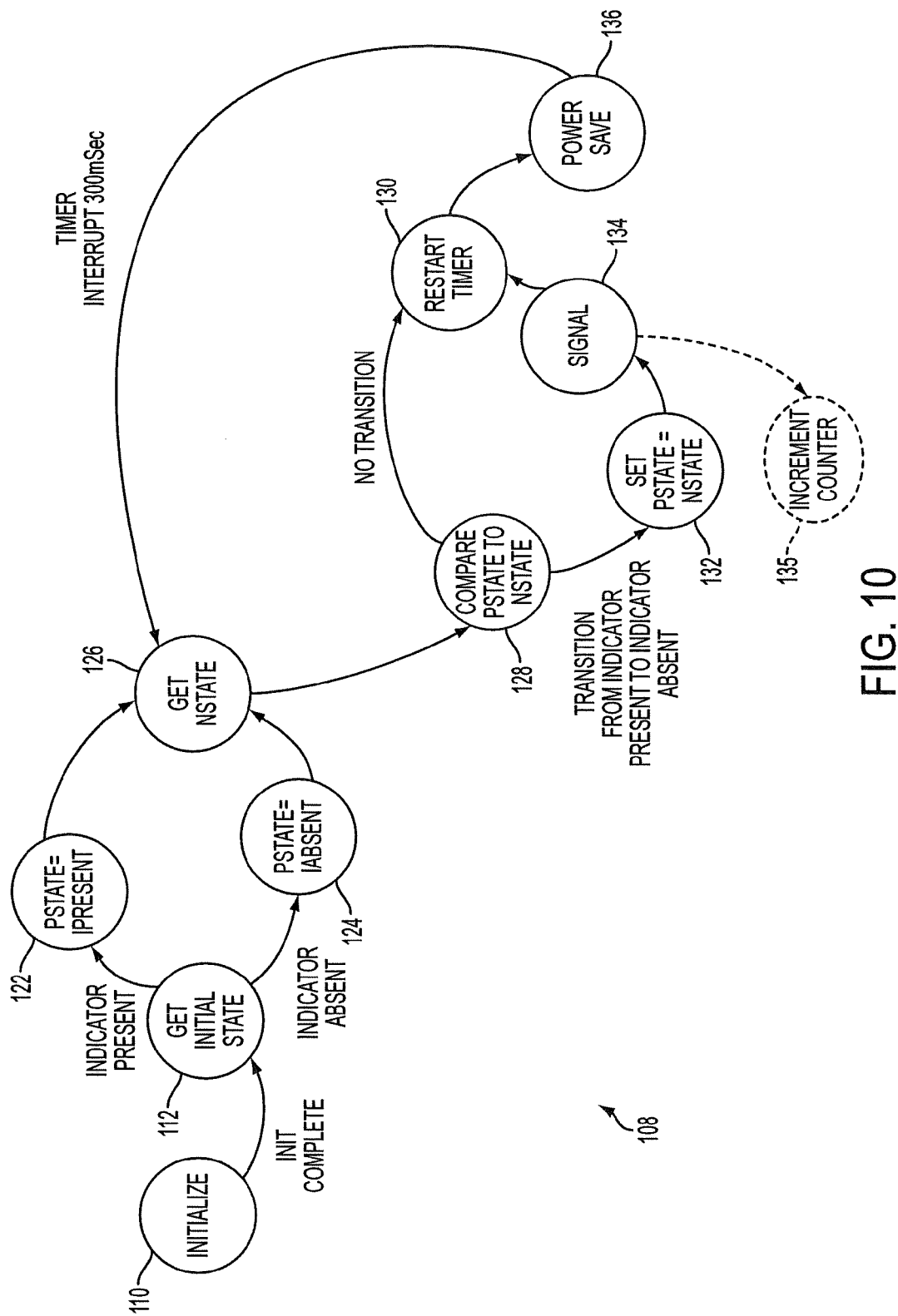
FIG. 10 is a state machine diagram in accordance with an exemplary embodiment of the invention.
Figure 15:
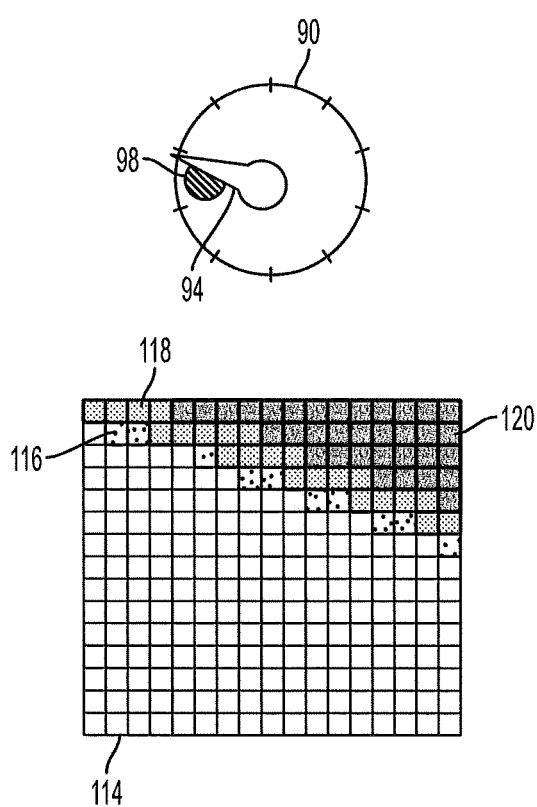
Figure 16:
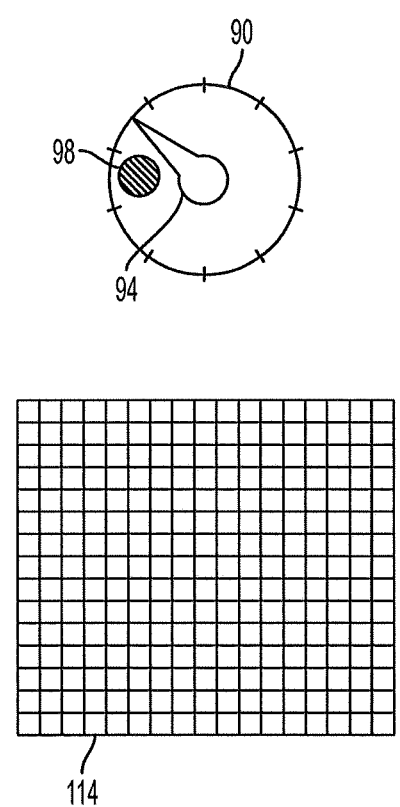

One embodiment of state machine 108 for the optical sensor 20 is illustrated in FIG. 10. The state machine 108 starts in the Initialization state 110. While in this Initialization state 110, the control circuitry initializes or "boots-up" and performs routine status and error checking to ensure that the control circuitry 55 is operating properly. The control circuitry 55 may also perform any calibrations that may be needed to adjust the operation of the optical sensor to the application or environment in which it is being installed. For example, the optical sensor may be installed on different types of devices that may have different color or shades of a color for a background. The initialization state 110 may sample the background on the device to determine thresholds that will be used later for determining when an indicator is positioned within the area of interest.

The background threshold may be determined several ways depending on how the acquired image data will be analyzed. In the exemplary embodiment, the control circuitry 55 utilizes the average pixel value in average register 69. In this embodiment, the background threshold becomes a single value against which subsequent image average values are compared. In other embodiments, the control circuitry 55 performs image analysis to determine the presence of the indicator. In these image analysis embodiments, the background threshold may be an array of values against which subsequent image pixel values are compared.

For the embodiments that determine the presence of the indicator by the average pixel value, the background threshold value may be determined in several ways. In the exemplary embodiment, the background threshold is simply set to a predetermined value. In another embodiment, the Initialization state 110 samples the background in a position or a time when the indicator is not present in the area of interest 98. The pixels values of the sampled background may then be used as the background threshold. In yet another embodiment, the averaged pixel values of the sampled background may be compared with values in a lookup table of expected ranges. The background threshold may then be set to a predetermined value defined in the lookup table. The use of an average pixel value to evaluate the acquired image has advantage in speed and computation time. A processor may accomplish the averaging of an array of values very quickly. Similarly, the comparison of a single value to a threshold is much faster than the comparison of an array of 225 values. As will be described below, this allows the image to be evaluated and the system returned to a low power consumption mode quickly. Thus, the shortened computation requirements further have a beneficiary impact on battery life.

The state machine 108 then transitions to Initial state 112, which determines the initial conditions in the area of interest 98. The initial conditions are determined by acquiring an image then determining an average acquired image value. This average acquired image value is then compared to the background threshold value. Since darker colors have a lower pixel value, with a value of zero being absolute black, the presence of an indicator will lower the average pixel density. For example, in FIG. 11, the indicator 94 is positioned at approximately the three-o'clock position and the area of interest 98 is positioned at the nine-o'clock position. Thus, area of interest is empty and the pixel array 114 is a substantial uniform white and would have an average pixel value of 256. It should be appreciated that an absolute white background is for exemplary purposes only and that in actual practice, the background may have artifacts, such as markings, texture and shadows for example, that lower the background threshold to an average pixel value range of between 60 to 90.

It should be appreciated that while the embodiments provided herein discuss a light or white background with a dark indicator, the claimed invention should not be so limited. The systems and methods discussed herein are equally applicable to applications having different color or shading combinations, such as a black or dark-gray background and a white or light-colored indicator. Further, as used herein, when a threshold is "exceeded", does not refer to the parameter becoming greater than, or going above the threshold. Rather, the term "exceed" refers to the crossing of the threshold, either from above or below the given value, to satisfy a specified condition.

As the indicator 94 moves through the area of interest as illustrated in FIGS. 12-14, the individual pixel values will change. For exemplary purposes, only three different pixel values are used, a light gray pixel 116, a medium gray pixel 118 and a dark gray pixel 120. It should be appreciated that as the indicator 94 moves through the area of interest 98, some of the pixel values will change to a variety of shades of gray that approximately form the shape of the indicator 94. Thus, when the indicator is fully within the area of interest 98 as shown in FIG. 14, the average pixel value for the array 114 should be at its lowest. In the exemplary embodiment, the average acquired pixel value for pixel array 114 may be between 30 and 50 when the indicator is substantially within the area of interest 98.

If the Initial state 112 determines that the indicator 94 is within the area of interest 98, the state machine 108 transitions to Previous state 122 where a variable "Pstate" is set to a value of "Ipresent". The variable Pstate is used by the state machine 108 determines location of the indicator 94 relative to the area of interest for the currently acquired image. If the Initial state 112 determines that the indicator 94 is not in the area of interest 98, the state machine 108 transitions to Absent state 124. Absent state 124 sets the variable Pstate to a value of "Iabsent". Once the Pstate variable has been set, the state machine 108 transitions to Get-New state 126.

Get-New state 126 acquires a new image of the area of interest 98. The acquired image is then used to determine an average pixel value for the new image. The presence or absence of the indicator is then determined by comparing the new image average pixel value to the background threshold. If this indicates that the indicator 94 is present, then Get-New state 126 assigns the variable "Nstate" to a value of "Ipresent." Similarly, if the indicator 94 is not present, then Get-New state 126 set the variable Nstate to a value of "Iabsent."

The state machine 108 then transitions to Compare state 128. The Compare state 128 takes the variables Pstate and Nstate and compares their values. If the values are the same, e.g. Pstate=Iabsent and Nstate=Iabsent, then there is no transition in regarding the presence or absence of the indicator 94. If variables Pstate and Nstate are the same, state machine 108 transitions to Timer state 130 where an interrupt timer is reset.

If Compare state 128 determines that the variables Pstate and Nstate are not equal, then the state machine 108 transitions to the Set state 132. Set state 132 changes the variable Pstate to equal Nstate. State machine 108 then transitions to Signal state 134. Signal state 134 generates a signal, such as a pulse to relay 47 as described above. In the exemplary embodiment, the signal generated by Signal state 134 is used to increment an Increment state 135 to determine the number of times the indicator 94 passes through the area of interest 98.

Once the signal has been generated, the state machine transitions to Timer state 130 where the interrupt timer is reset.

Once the interrupt timer is reset, the state machine 108 transitions to Sleep state 136. In Sleep state 136, the control circuitry 55 is placed in a low power consumption mode of operation to minimize any power drain on the battery 45. When the interrupt timer expires, the state machine 108 exits Sleep state 136 and loops back to Get-New state 126 and the process begins again.

In the exemplary embodiment, the interrupt timer is set to 300 milli-seconds. Thus, approximately 3 new images are acquired every second. Since the interrupt timer determines how often the control circuitry 55 activates. The setting of the interrupt timer will depend on both the application, and the desired battery 45 life. In one embodiment, the optical sensor 20 is coupled to a meter, such as a residential gas meter. In this type of application, the indicator 94 moves very slowly, perhaps making only three to four revolutions per month Thus, taking three images per second provides a robust monitoring of the indicator 94 with little to no risk of potential missing the transit of the indicator 94 through the area of interest. It should be appreciated that other applications may require a shorter interrupt timer, or allow a longer interrupt timer.

In one embodiment, the length of time the interrupt time is set for may be changed by the control circuitry 55 depending on the level of usage. In this embodiment, the interrupt timer is set for a minimum expected time that would allow for reliable monitoring of the area of interest. The state machine then accumulates data regarding the frequency in which the indicator 94 passes through the area of interest. This data is accumulated over a period of time, such as from a few days to a few months for example. From the accumulated data, the control circuitry 55 changes the interrupt timer period to maximize the timer length while still providing reliable and robust monitoring. Periodically, the control circuitry 55 may revert to the original setting and accumulate indicator 94 frequency data to confirm that the interrupt timer is still set to the appropriate length. The capability to change the interrupt timer period provides additional advantages in saving battery life and minimizing maintenance costs.

The embodiments above describe use the average pixel value to determine the presence or absence of the indicator 94. In other embodiments, the control circuitry 55 uses image analysis, such as pattern recognition techniques to determine if the indicator 94 is within the area of interest 98. The image analysis method may also provide additional advantages where multiple images are acquired as the indicator 94 moves through the area of interest. From this data, addition information, such as the rate at which the indicator 94 is moving for example, may also be determined.

The optical sensor 20 provided herein includes a number of benefits and advantages. It allows the use of a low cost CMOS sensor to be used to monitor for the presence of an object in an area of interest. Further, it provides for extended battery life by operating in a low power consumption mode, or a "sleep mode" for a period of time after acquiring an image. Finally, the optical sensor 20 provides for a means for using the average pixel value of the CMOS sensor pixel array to determine if an indicator has entered and left the area of interest.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. One technical effect of the executable instructions is to monitor for movement or motion within an area of interest using a recorded image and measure the number of times such motion is recorded.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of operating a sensor comprising the steps of:
   capturing a first image with a sensor having an array of pixels;
   generating a first image value from said first image, wherein said first image value is an average of individual pixel values in said array of pixels;
   storing said first image value;
   comparing said first image value to a threshold;
   generating a signal if said first image value exceeds said threshold;
   capturing a second image with said sensor;
   generating a second image value from said second image, wherein said second image value is an average individual pixel values in said array of pixels;
   comparing said second image value to said first image value;
   determining if said first image exceeds said threshold and said second image does not exceed said threshold; and
   generating said signal if said first image exceeds said threshold and said second image does not exceed said threshold;
   reducing power consumption in said sensor after generating said signal;
   setting an interrupt timer before said step of reducing power consumption; and,
   generating an interrupt signal when said interrupt timer expires.

2. The method of claim 1 further comprising the step of incrementing a counter in response to said signal.

3. A method of operating a system having a sensor capable of acquiring images in an area of interest, said method comprising:
   acquiring a first image with said sensor;
   determining a first image value for said first image, wherein said first image value is an average pixel value for said first image;
   setting a previous-state variable to a first value if said first image value is above a threshold value;
   setting said previous-state variable to a second value if said first image value is at or below said threshold value;
   acquiring a second image with said sensor;
   determining a second image value for said second image, wherein said second image value is an average pixel value for said second image;
   setting a new-state variable to said first value if said second image value is above said threshold value;
   setting said new-state variable to said second value if said second image value is below said threshold value; and,
   comparing said new-state variable to said present-state variable and generating a signal if said new-state variable is equal to said second value and said previous-state value is equal to said first value;
   initializing said sensor;
   acquiring a third image before acquiring said first image;
   determining a third image value from said third image, wherein said third image value is an average pixel value for said third image;
   setting said threshold value based on said third image value;
   setting said new-state variable equal to said previous-state variable; and,
   generating a signal in response to said new-state variable being set equal to said previous-state variable;
   setting an interrupt timer;
   operating said sensor in a low electrical power consumption mode; and,
   generating an interrupt signal when said interrupt timer expires.

4. The method of claim 3 wherein said signal increments a counter on an advanced metering infrastructure meter.

5. An optical sensing system comprising:
   an optical sensor including an array of pixels, wherein each of said pixels generate a second signal corresponding to a quantity of light received by each of said pixels for said first acquired image, and wherein each of said pixels generate a third signal corresponding to a quantity of light received by each of said pixels for said second acquired image;
   a lens adjacent said optical sensor and arranged to focus said optical sensor on an area of interest;
   a controller electrically coupled to said optical sensor, said controller having a first processor that is responsive to executable computer instructions for determining if an object is present in the area of interest in a first acquired image and not present in a second acquired image and transmitting a first signal in response to said object being present in said first acquired image and not present in said second acquired image, wherein said second acquired image is acquired later in time than said first acquired image;

a meter operably coupled to received said first signal from said controller, said meter having a second processor responsive to executable instructions to increment a consumption counter in response to receiving said first signal;

wherein said first processor is further responsive to said second signals to generate a first average pixel value for said array of pixels for said first acquired image;

wherein said first processor is further responsive to executable computer instructions for comparing said first average pixel value and said second average pixel value and generating said first signal if said first average pixel value exceeds a threshold and said second average pixel value does not exceed a threshold.

6. The system of claim 5 wherein said first processor is further responsive to executable computer instructions to initiate an interrupt timer after comparing said first average pixel value to said second average pixel value.

7. The system of claim 6 wherein said first processor is further responsive to executable computer instructions to activate a low power consumption mode for said controller after initiating said interrupt timer.

\* \* \* \* \*